US011896983B2

(12) United States Patent
Mitchell et al.

(10) Patent No.: US 11,896,983 B2
(45) Date of Patent: Feb. 13, 2024

(54) WELLSITE WET SCREENING SYSTEM FOR PROPPANTS AND METHODS OF USING SAME

(71) Applicant: Propflow, LLC, Fulshear, TX (US)

(72) Inventors: Jeremy Britt Mitchell, Little Rock, AR (US); Christopher Shane Martin, Wooster, AR (US)

(73) Assignee: Propflow, LLC, Little Rock, AR (US)

( * ) Notice: Subject to any disclaimer, the term of this patent is extended or adjusted under 35 U.S.C. 154(b) by 0 days.

(21) Appl. No.: 17/902,753

(22) Filed: Sep. 2, 2022

(65) Prior Publication Data

US 2023/0001424 A1 Jan. 5, 2023

Related U.S. Application Data

(63) Continuation of application No. 17/807,133, filed on Jun. 15, 2022, now Pat. No. 11,465,155.

(60) Provisional application No. 63/366,313, filed on Jun. 13, 2022, provisional application No. 63/211,509, filed on Jun. 16, 2021.

(51) Int. Cl.

| | |
|---|---|
| ***B03B 5/04*** | (2006.01) |
| ***E21B 43/26*** | (2006.01) |
| ***B03B 11/00*** | (2006.01) |

(52) U.S. Cl.

CPC ................ *B03B 5/04* (2013.01); *B03B 11/00* (2013.01); *E21B 43/2607* (2020.05)

(58) Field of Classification Search

CPC ...... E21B 43/2607; E21B 43/34; E21B 43/35; E21B 43/385; E21B 43/40; B03B 5/00; B03B 5/04; B03B 7/00; B03B 9/02; B03B 11/00; B07B 1/005

See application file for complete search history.

(56) References Cited

U.S. PATENT DOCUMENTS

| | | | |
|---|---|---|---|
| 3,432,151 | A | 3/1969 | O'Loughlin et al. |
| 5,732,993 | A | 3/1998 | Dahl |
| 7,461,746 | B1 | 12/2008 | Egge et al. |
| 8,424,784 | B1 | 4/2013 | Munisteri |
| 8,881,749 | B1 | 11/2014 | Smith |
| 8,926,252 | B2 | 1/2015 | McIver |
| 9,140,110 | B2 | 9/2015 | Coli et al. |
| 9,409,184 | B1 | 8/2016 | Mickelson |
| 9,410,410 | B2 | 8/2016 | Broussard et al. |
| 9,744,537 | B2 | 8/2017 | Convery et al. |
| 9,752,389 | B2 | 9/2017 | Pham et al. |
| 10,155,205 | B2 | 12/2018 | Oklejas, Jr. |
| 10,176,733 | B1 | 1/2019 | Brodnex |

(Continued)

FOREIGN PATENT DOCUMENTS

| | | | | |
|---|---|---|---|---|
| KR | 100650509 B1 | 11/2008 | | |
| WO | WO-2019098987 A1 * | 5/2019 | ............... | C09K 8/80 |

OTHER PUBLICATIONS www.patbase.com, Translation of KR10-0650509, May 18, 2021, 18 pgs, Internet.

(Continued)

*Primary Examiner* — Joseph C Rodriguez

(74) *Attorney, Agent, or Firm* — McAughan Deaver PLLC

(57) ABSTRACT

The invention comprises a system for wet screening of oil well proppant at the wellsite to provide a controlled and controllable amount of properly sized and screened proppant and fluid to a frac fluid blending system.

31 Claims, 11 Drawing Sheets

(56) References Cited

U.S. PATENT DOCUMENTS

| | | | |
|---|---|---|---|
| 10,378,326 | B2 | 8/2019 | Morris et al. |
| 10,787,312 | B2 | 9/2020 | Oren et al. |
| 10,982,505 | B2 | 4/2021 | Oehler et al. |
| 11,364,507 | B2 | 6/2022 | Convery |
| 11,376,631 | B2 | 7/2022 | Kykyri et al. |
| 2008/0257449 | A1 | 10/2008 | Weinstein et al. |
| 2015/0086307 | A1 | 3/2015 | Stefan |
| 2018/0214889 | A1* | 8/2018 | Convery .................. B03B 5/04 |
| 2018/0339278 | A1 | 11/2018 | Morris et al. |
| 2019/0351428 | A1* | 11/2019 | Moran .................... B07B 15/00 |
| 2020/0048985 | A1 | 2/2020 | Oehler et al. |
| 2020/0370405 | A1* | 11/2020 | Nguyen .................. C09K 8/80 |
| 2020/0385955 | A1* | 12/2020 | Morris ...................... E02D 3/00 |
| 2021/0024291 | A1 | 1/2021 | Teichrob et al. |
| 2021/0069751 | A1* | 3/2021 | Kykyri .................... B07B 1/005 |
| 2021/0178345 | A1 | 6/2021 | Arceneaux |
| 2021/0198994 | A1* | 7/2021 | Christinzio ....... B01F 35/71775 |

OTHER PUBLICATIONS

Ian Wilson, System Eliminates Frac Sand Drying, The American Oil & Gas Reporter, Aug. 2020.

USPTO, International Search Report, PCT/US22/72974, dated Sep. 9, 2022.

USPTO, Written Report, PCT/US22/72974, dated Sep. 9, 2022.

* cited by examiner

WELLSITE WET SCREENING SYSTEM FOR PROPPANTS AND METHODS OF USING SAME

CROSS REFERENCE TO RELATED APPLICATIONS

This application is a continuing application of U.S. patent application Ser. No. 17/807,133, filed on Jun. 15, 2022, now U.S. Pat. No. 11,465,155, which claims benefit of and priority to U.S. Provisional Patent Application Ser. No. 63/211,509, filed on Jun. 16, 2021, and claims benefit of and priority to U.S. Provisional Patent Application Ser. No. 63/366,313 filed on Jun. 13, 2022, the entire disclosure of each is incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and enabled herein relate to wet screening at the wellsite of wet or dry proppant materials for immediate use in fracing a subterranean well.

Description of the Related Art

When fracturing a subterranean hydrocarbon formation (hereafter "fracing"), properly sized proppant is blended at the wellsite with fluids and chemicals specific to that particular well to create a frac fluid that is then injected or pumped into the wellbore and surrounding formation. The first formation fracturing operation was done in 1947 with silica sand as the proppant. Since then, many materials have been used as proppants including walnut hulls, natural sand, glass, resin coated sand, sintered bauxite and kaolin, and fused zirconia. Today, fracking is used in approximately 95 percent of oil and gas wells in the United States, and sand and ceramic proppants are the two most common proppants used.

Generally, Frac sand is not used as mined without processing. Sand processing includes mining sand deposits, crushing, washing/cleaning, drying, and sizing the sand grains. The size range of proppant is an important consideration for the frac plan. Proppant sizes are generally between 8 and 140 mesh (2.38 mm and 0.105 mm). The mesh size is the number of openings across one linear inch of screen. When describing the size of the proppant, the proppant is typically referred to as simply the sieve cut. For example, 16/30 mesh is 1.19 mm to 0.595 mm.

Proppant processing and particularly sizing and screening of the proppant conventionally occurs at a proppant facility, such as sand plant. The processing plant is usually a significant distance from the wellsite, such that the processed proppant must be delivered or shipped by wheeled vehicle to the wellsite. In other words, conventionally, proppant is processed, including screened for size, and packaged at the distant proppant facility for delivery to the wellsite or well staging area. Depending on how the proppant is transported to the wellsite (e.g., open rail car or open trailer) and how the proppant is stored at the at the wellsite (e.g., unprotected piles) and other factors, the proppant may be or may become contaminated as to size range, proppant contaminants, such as debris, and otherwise. Any one of these can compromise the blending equipment, compromise the performance of the frac fluid, and/or compromise the production performance of the well. Further, as multiple horizontal runs are created from one wellsite or wellbore, changes to the frac plan between horizontal runs, and even within a single horizontal run, may require resizing of the proppant, which may require time consuming conventional delivery of alternately sized proppant to the wellsite or staging area.

Also, because the cost of conventional transportation or shipment is related to the weight of the cargo, the proppant (e.g., sand) is dried at the proppant facility in furnaces to remove water content and thereby reduce shipping weight and costs. The drying process is the bottleneck of the frac sand production process and burns fossil fuel (natural gas, propane, etc.) at high rates to complete the drying process. It is well documented that hydrocarbon fired furnaces for drying proppant to reduce its shipping costs consumes large amounts of energy and creates a large and undesirable carbon footprint. The drying process is estimated to create 17-38 tons of $CO_2$ emissions per 1,000 dried tons depending on the drying process and fuel type. Drying accounts for 50% or more of frac sand production costs.

The inventions disclosed and enabled herein address one or more of the issues discussed above and eliminate the need to store proppant at the wellsite or staging area in a contamination-proof manner, reduce the carbon footprint of fracing by reducing or eliminating the need to dry proppant, facilitate the use of wet or dry proppant at the wellsite, wet screening of the proppant for size debris removal, any one of which may reduce the total cost to the end user and the environment.

SUMMARY OF INVENTIONS

As one of the many possible summaries, our inventions may comprise a material supply system having a variable speed motor and a material weight sensor for supplying material to hopper with an outlet disposed over at least a portion of a vibratory screen, and a conduit for passing material and fluid that pass through the screen without removing the material from the fluid.

As another of the many possible summaries, our inventions may comprise a system for creating a slurry with a wet screening assembly comprising a screen with a plurality of openings through which material may pass, and a material hopper with an outlet disposed above at least a portion of the screen; a material supply assembly comprising a variable speed motor and a material weight sensor, and wherein the material supply assembly is arranged to supply material to the material hopper at a controlled rate; a fluid supply assembly comprising a fluid pump, and wherein the fluid supply assembly is arranged to supply fluid to the wet screening assembly; a bin located below the wet screening assembly such that material and fluid that pass through the screen are collected in the bin as the slurry; wherein a concentration of material in the slurry is determined by a rate or rates at which the material supply assembly supplies material to the material hopper and/or by a rate or rates at which fluid is supplied to the wet screening assembly; and a conduit coupled to the bin for passing the slurry from the bin without removing the material from the fluid.

As another one of the many possible summaries, our inventions may compromise a system for creating a proppant slurry for use in hydraulic fracturing operations, the system having a wet screening assembly comprising a screen with a plurality of openings through which proppant and fluid may pass, and a hopper with an outlet disposed above at least a portion of the screen; a proppant supply assembly comprising a variable speed motor, and wherein the proppant supply assembly is arranged to supply material comprising proppant to the hopper; a fluid supply assembly comprising a pump and a fluid meter, and wherein the fluid supply assembly is arranged to supply fluid comprising water to the wet screening assembly; a bin located below the wet screening assembly such that proppant and fluid that pass through the screen are collected in the bin as the proppant slurry; an outlet in the bin for passing the proppant slurry from the bin; wherein a concentration of proppant in the slurry is determined by a rate or rates at which the proppant supply assembly supplies proppant to the hopper and/or by a rate or rates at which fluid is supplied to the wet screening assembly; and a conduit coupled to the bin for passing the proppant slurry from the bin without separating the proppant from the fluid.

Our inventions also may comprise a system for creating a sand and water slurry for use with a subterranean formation, the system having a wet screening assembly comprising a screen with a plurality of openings through which sand and water may pass, a hopper with a sand inlet, a water inlet, and an outlet, the outlet having an area less than a sand inlet area, and the outlet disposed above at least a portion of the screen; a sand supply assembly comprising a motor, a variable speed motor drive and a weight sensor, and wherein the sand supply assembly is arranged to supply sand to the hopper; a screen leveling assembly wherein the screen can be leveled before or during wet screening of sand; a water supply assembly comprising a pump and a flow meter, and wherein the water supply assembly is arranged to supply water to the wet screening assembly; a bin located below the wet screening assembly such that sand and water that pass through the screen are collected in the bin as the sand slurry; wherein a concentration of sand in the slurry is determined by a rate or rates at which the sand supply assembly supplies sand to the hopper and/or by a rate or rates at which water is supplied to the wet screening assembly; and a conduit coupled to the outlet for passing the sand slurry from the bin without separating the sand from the water.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the specification and are included to illustrate certain aspects of the present inventions other than with words. The inventions disclosed and enabled herein are best understood by reference to one or more of these figures in combination with the detailed written description of specific embodiments presented herein.

Figure 1:
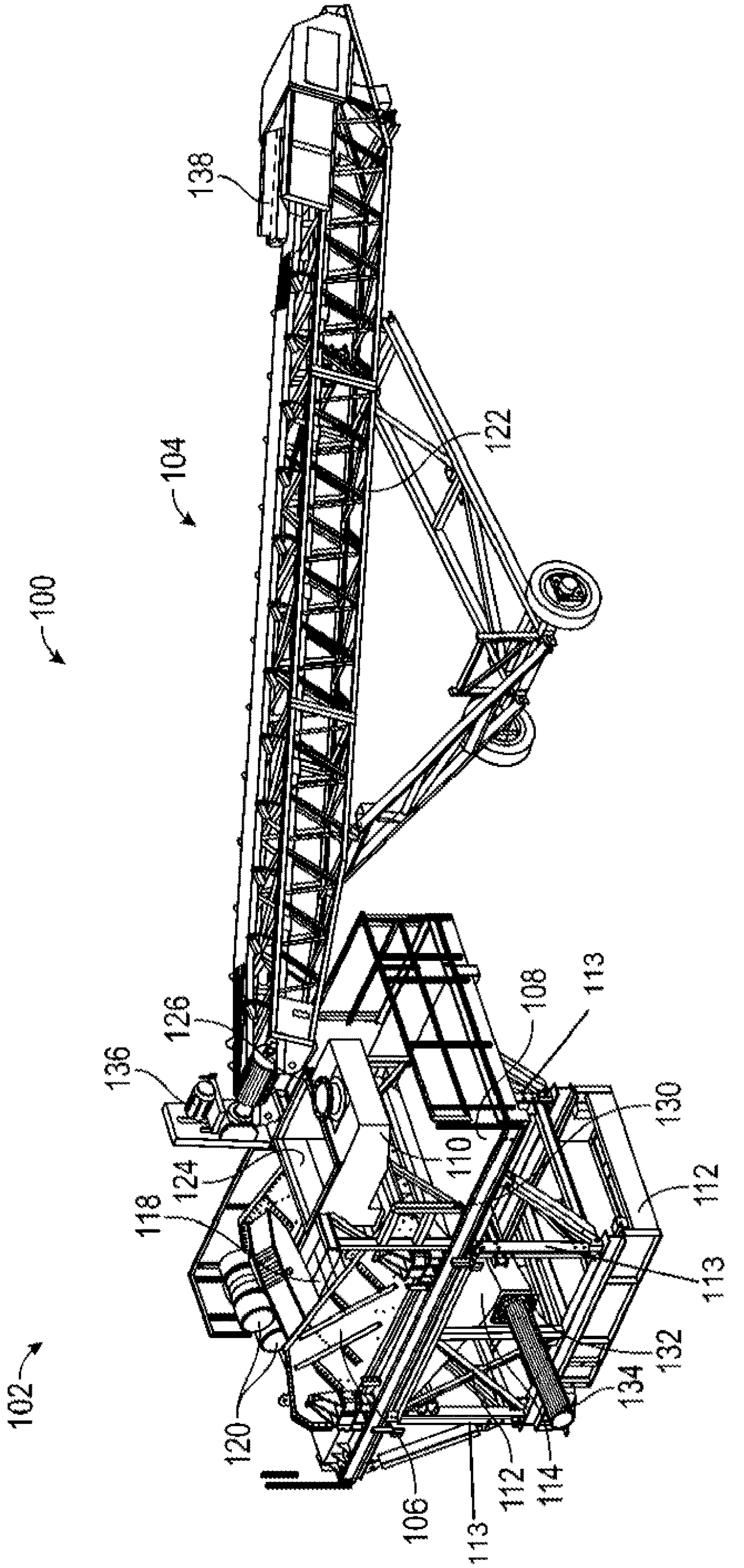
FIG. 1 illustrates a perspective view of one of many possible embodiments of a wellsite wet screening system.

While the inventions disclosed herein are amenable to various modifications and alternative forms and embodiments, only a few specific embodiments have been shown by way of illustration in the drawings and the written specification. The figures and written descriptions of these specific embodiments are not intended to limit the breadth or scope of our inventions or to define the literal scope of the appended claims. Rather, the figures and detailed written descriptions are provided to teach and enable a person or ordinary skill in this art to make and use our inventions whether or not a specific embodiment of such is disclosed herein.

DETAILED DESCRIPTION

Those persons skilled in the art will appreciate that not all features of a commercial embodiment of incorporating our inventions are described or shown for the sake of clarity and understanding. Persons of skill in this art also will appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

Aspects of the inventions disclosed herein may be disclosed as an apparatus, system, or method. Accordingly, specific embodiments may take the form of an entirely hardware embodiment, or an embodiment combining software and hardware aspects, such as a "circuit," "module" or "system." Furthermore, embodiments of the present inventions may involve computer program products embodied in one or more computer readable storage media having computer readable program code.

Items, components, functions, or structures in this disclosure may be described or labeled as a "module" or "modules." For example, but not limitation, a module may be configured as a hardware circuit comprising custom VLSI circuits or gate arrays, off-the-shelf semiconductors such as logic chips, transistors, or other discrete components. A module also may be implemented as programmable hardware devices such as field programmable gate arrays, programmable array logic, programmable logic devices, or the like. Modules also may be configured as software for execution by various types of processors. A module of executable code may comprise one or more physical or logical blocks of computer instructions that may be organized as an object, procedure, or function. The executables of a module need not be physically located together but may comprise disparate instructions stored in different locations that when joined logically together, comprise the module and achieve the stated purpose or function. A module of executable code may be a single instruction, or many instructions, and may even be distributed over several different code segments, among different programs, and across several memory devices. Similarly, data may be identified and illustrated herein within modules, and may be embodied in any suitable form and organized within any suitable type of data structure. The data may be collected as a single dataset or may be distributed over different locations including over different storage devices, and may exist, at least partially, merely as electronic signals on a system or network. Where a module or portions of a module are implemented in software, the software portions may be stored on one or more computer readable storage media.

Computer program code for carrying out operations of one or more of the present inventions may be written in any combination of one or more programming languages, including an object-oriented programming language such as Java, Python, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an exterior computer for example, through the Internet using an Internet Service Provider.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Reference throughout this disclosure to "one embodiment," "an embodiment," "a first embodiment" or similar language means that a particular feature, structure, or characteristic described in connection with the embodiment is included in at least one of the many possible embodiments of the present inventions. Persons of skill in the art will readily understand that features or components described with respect to one embodiment may be utilized with other disclosed and undisclosed embodiments without departing from the inventions disclosed and enabled herein. In other words, the described features, structures, or characteristics of one embodiment may be mixed, matched and/or combined in any suitable manner in one or more other embodiments.

The description of elements in each Figure may refer to elements of proceeding Figures. Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Turning now to our inventions, we have created systems and methods that allow wet screening of proppant, such as, but not limited to sand, at the wellsite so that a properly sized and debris-free proppant frac slurry with a known (e.g., controlled or estimated) amount of water may be directly, if not immediately, delivered to a conventional (or unconventional) frac fluid blending unit (e.g. a frac blender truck) for finalization of the frac fluid chemistry followed by injection into the well or wells. Our inventions are especially useful at those fields or basins where proppant is stored in exposed conditions, such as an exposed pile, where foreign particles, such as gravel or dirt, can contaminate the proppant, and is also useful when proppant is delivered or stored in unexposed tote bags or trucks. Our inventions also are useful in those fields or basins that use locally sourced proppant, such as as-mined sand, which can be delivered to the wellsite with little to no processing at a proppant facility prior to delivery. For example, our inventions can use "dry" proppant (i.e., less than about 1% water by weight) or "wet" proppant (i.e., greater than about 1% water by weight). Our inventions also facilitate the use of non-specialized bulk material transports, such as dump trucks, end dumps and belly dumps. Our inventions are environmentally friendly in that all water introduced into our systems may be, if desired transferred to a frac fluid blending system for ultimate injection into the well. No wastewater need be produced. Our inventions also are useful in those basins or well sites where the frac plan is subject to modification or change during a frac job. Other benefits of our inventions will become apparent to those of skill in the art by reading this disclosure.

The wellsite wet screening systems taught herein are for use immediately adjacent the well that is to be frac'ed. By "immediately adjacent," we mean that the wet screening system is physically located near the wellhead such that the wet screened proppant from the wet screening system can be directly, such as immediately, supplied to the frac fluid blending system or truck during the wet screening process. As a non-limiting example of a wellsite wet screening system being immediately adjacent a land-based wellhead is when the proppant slurry collection bin discharge is within 250 feet of the wellhead.

In some of the many possible embodiments of our inventions, it is contemplated that the proppant, whether sand, coated sand, ceramic, or otherwise, for a particular well, may be loaded into an inlet hopper, mixed with water, and delivered to a vibrationary screening assembly. In other of the many possible embodiments of our inventions, it is contemplated that the proppant, whether sand, coated sand, ceramic, or otherwise, for a particular well, may be loaded on to a conveyor for transport to an inlet hopper, mixed with water and delivered to a vibrationary screening assembly. In still other of the many possible embodiments of our inventions, it is contemplated that the proppant, whether sand, coated sand, ceramic, or otherwise, for a particular well, may be loaded into a load hopper by a material handler, such as a frontend loader, and then deposited, such as by metering, on to a conveyor for transport to an inlet hopper, mixed with water and delivered to a vibrationary screening assembly.

Our inventions utilize a vibratory screening assembly to wet screen the proppant so that proppant smaller than a predetermined size and/or shape (determined by the screen) passes through the screen and falls into an enclosed area or bin. Fluid, preferably fresh water or produced water, may be used with the screening operation to wet screen the proppant. Fluid also may be used in a feed box associated with the screening structure to efficiently transfer the proppant into the vibratory screening assembly. In operation, the water falls through the screen along with the properly sized proppant into the enclosed area. Oversized proppant and contaminates exit the screener, such as at one end, and do not pass through the screen. Gravity or a slurry pump, or both, may be used to feed the screened proppant slurry from the enclosed bin frac fluid blending system for finalization of the frac fluid prior to injection. The amount of fluid added to the vibratory screening assembly may be metered and/or controlled so that the amount of proppant and fluid delivered to the frac fluid blending system is known and/or controlled. It also is contemplated that one or more chemicals may be introduced with the fluid supplied for wet screening.

As mentioned, a proppant conveyor system may be used to feed the vibratory screening assembly, and if used, is preferably a load hopper and belt conveyor system with a weight transducer, such as a belt scale, to determine the amount (e.g., weight) of proppant conveyed and to determine the rate (e.g., lbs/hour) of proppant added to the vibratory screening assembly. Preferably, one or more variable frequency drive AC motors are used to power and provide control of the amount of proppant supplied.

The vibratory screening assembly system preferably has an inlet hopper that the main conveyor, if used, dumps proppant into. The inlet hopper also may include a controllable feed system to add proppant to the sizing screen at controlled/controllable rates and patterns. Preferably, however, we contemplate that the inlet hopper simply passes the proppant slurry to the screen without controlling the feed rate. It is preferred that the system that loads proppant onto the main belt conveyor controls the amount of proppant delivered to the screen.

We contemplate proppant feed rates into the inlet hopper for embodiments of our inventions of between about 5 ton/hr and about 1,500 ton/hr, and preferably between about 100 ton/hour and about 800 ton/hour. We contemplate fluid flow rates into the vibratory screening assembly of between about 500 gal/min (12 bbl/min) to about 5000 gal/min (119 bbl/min), and preferably between about 24 bbl/min (1,000 gal/min) and about 100 bbl/min (4,200 gal/min). It is preferred that embodiments of the inventions disclosed herein provide a proppant slurry to the frac fluid blender system in amounts ranging between about 0.3 lbs of proppant per gallon of water (i.e., about 8.6 lbs/gal) to about 12 lbs of proppant per gallon of water (i.e., about 20.3 lbs/gallon), and preferably between about 1 lbs proppant/gallon of water and about 10 lbs proppant/gallon water.

Preferred embodiments of our inventions are modular and mobile so that the wellsite wet screening system can be relocated easily to different well sites. In mobile embodiments, the screen system is preferably sized and constructed so that it can be hauled on and operated from a highway vehicle or tractor trailer without oversize permits or height issues. Additionally, our wellsite wet screening system inventions may be used offshore, for example on a frac boat, as enabled herein.

Turning now to a first embodiment, FIG. 1 illustrates perspective view of a wet screening system 100 according to our inventions, comprising a wet screening component 102 and a proppant supply component 104. In this embodiment, the wet screening component 102 comprises a vibratory screening assembly 106, a screening platform 108, an inlet hopper 110, a platform support frame 112, and a frac slurry collection bin 114.

The vibratory screening assembly 106 may be a conventional vibratory screening machine comprising a body 116, a screen or sieve assembly (e.g., one or more screens) 118 having a plurality of openings therein of specific size and shape (not shown), and one or more vibratory motors 120 arranged to vibrate particles on the upper surface of the screen 118. The vibratory screening assembly 106 may be coupled to an upper surface of the platform 108, preferably with vibration isolating mounts.

The inlet hopper 110 may comprise an inlet or opening 124 sized and arranged to receive material, such as proppant, from a conveyor 122 or other material delivery system. The inlet hopper 110 further comprises a water inlet 126, such as a conduit flange, for receiving a flow of water into the hopper 110. The inlet hopper 110 comprises a discharge port 128 sized and arranged to deliver a slurry of proppant and water from the inlet hopper 110 to the inlet of the vibratory screening assembly 106. It is preferred that the volume of the discharge port 128 be less than the volume of the hopper 110 generally so that the hopper 110 provides a retention time for the incoming proppant and water before being discharged to the vibratory screening assembly 106. As illustrated in FIG. 1, the inlet hopper 110 may be supported above the vibratory screening assembly 106 inlet by a frame or support structure 130 coupled to the platform 108. It is preferred, but not required, that the inlet hopper frame 130 not be coupled to or contact the vibratory screening assembly 106.

The platform support frame 112 may be fabricated from structural members, such as steel beams, arranged and configured to carry the weight and operation of the wet screening component 102. Within the support frame 112 and preferably below the underside of the platform 108, is the frac slurry collection bin 114, which is sized and configured to receive the proppant slurry from the vibrating screen 118. For purposes of this disclosure, the slurry of proppant and water that pass through the screen or sieve 118 into the collection bin 114 will be referred as the "frac slurry" in contradistinction to the "proppant slurry" that is discharged 128 from the inlet hopper 110 onto the vibrating screen 118. The collection bin 114 may comprise one or more outlets 132, such as conduit flanges, through which the frac slurry may pass.

It is preferred that a flexible, semi-rigid or rigid frac slurry conduit 134 be coupled, including removably coupled, to the bin outlet 132 for delivery of the frac slurry to a frac fluid blending system (not shown). The outlet may have a diameter of about 14 inches or so. It will be understood that there are a variety of frac fluid blending systems of various designs that are used in the oil fields, and that the location and height of the proppant inlet portion of the blending truck may vary. Thus, for the embodiment illustrated in FIG. 1, the height of the bin outlet 132 may be adjusted by changing the height of the platform support frame 112, such as through adjustable length supports 113. Further, it is preferred that the adjustable length supports 113 allow for leveling of the wet screening component 102. It will be appreciated that the efficiency of the proppant screening process is directly affected by the levelness of the screen 118. As the levelness increases, the screening efficiency also increases. It should be noted that the system is operable at less than truly level conditions.

As also shown in FIG. 1, the wet screening system 100 comprises a proppant supply component 104, which may comprise any of a number of material supply systems, such as belt conveyor 122 having a conveyor drive assembly 136. In a preferred embodiment, the drive assembly may be a simple constant speed AC motor. Alternately, the drive assembly may comprise an AC motor and variable frequency drive for controllably delivering proppant to the inlet 124 in the hopper 110. In this particular embodiment, the belt conveyor 122 has a conveyor inlet 138 into which a controlled amount of proppant can be deposited for conveyance to the inlet hopper 110. For example and not limitation, a front-end loader, proppant box, proppant tote, or other material handling equipment may dump proppant into the conveyor inlet 138. As illustrated, the proppant supply component 104 is preferably trailerable to the well site, and it is preferred that proppant be supplied to the feed inlet hopper 110 at a rate ranging between about 100 ton/hour to about 700 ton/hour.

Figure 2:
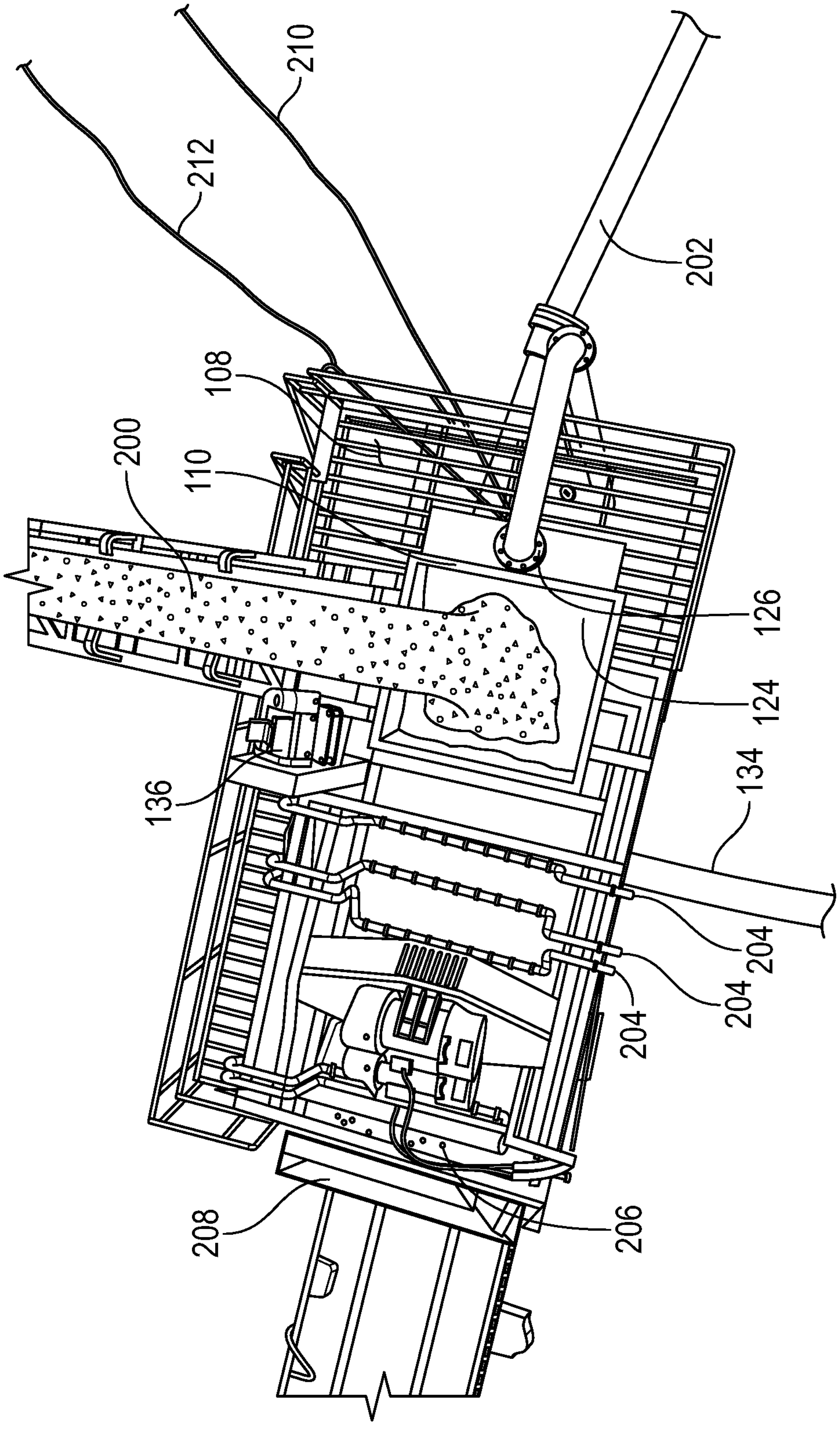
FIG. 2 illustrates a plan view of the wellsite wet screening system of FIG. 1.

FIG. 2 is a plan view of the wet screening system 100. Proppant 200 is shown on the belt conveyor 122 being fed into the inlet hopper 110 through hopper opening 124. Water supply conduit 202 is shown supplying water to water inlet 126 through rigid and flexible conduits. The water and proppant 200 mix in the hopper 110, and that proppant slurry is delivered to the vibratory screen assembly 118. FIG. 2 shows optional water spray bars or water spray heads 204 that add water to the proppant slurry on the vibratory screen assembly 118 to improve the efficiency of vibratory screening and/or increase the screening throughput rate as compared to dry screening. The spray bars may comprise simple holes or holes with conical splash plates to create a more spray like distribution or dedicated spray nozzles. Preferably, the spray bars or spray heads are not rigidly mounted to the vibratory screening assembly 106. As is known, oversized particles 206 in the proppant slurry cannot pass through the sized openings in the screen 118 and are moved to the discharge area of the vibratory screening assembly 106 for removal from the system 102. A discharge chute 208 may be attached at the discharge area to funnel or direct the oversized particles exiting the vibratory screening assembly 106 to a particular location. Also shown in FIG. 2 is the frac slurry discharge conduit 134 that feds the sized and cleaned frac slurry to the frac fluid blending system (not shown) for injection in the well. The power cables 210 for the vibratory screening assembly 106 also are shown.

Although not shown in FIG. 1 or 2, it is preferred that the water mist generated by the spray bars is contained, such as by a cover over the vibratory screening assembly 106. It is contemplated that a flexible cover, such as vinyl rubber or the like is fitted over the assembly 106 to prevent water mist from exiting the wet screening component 102.

Figure 3A:
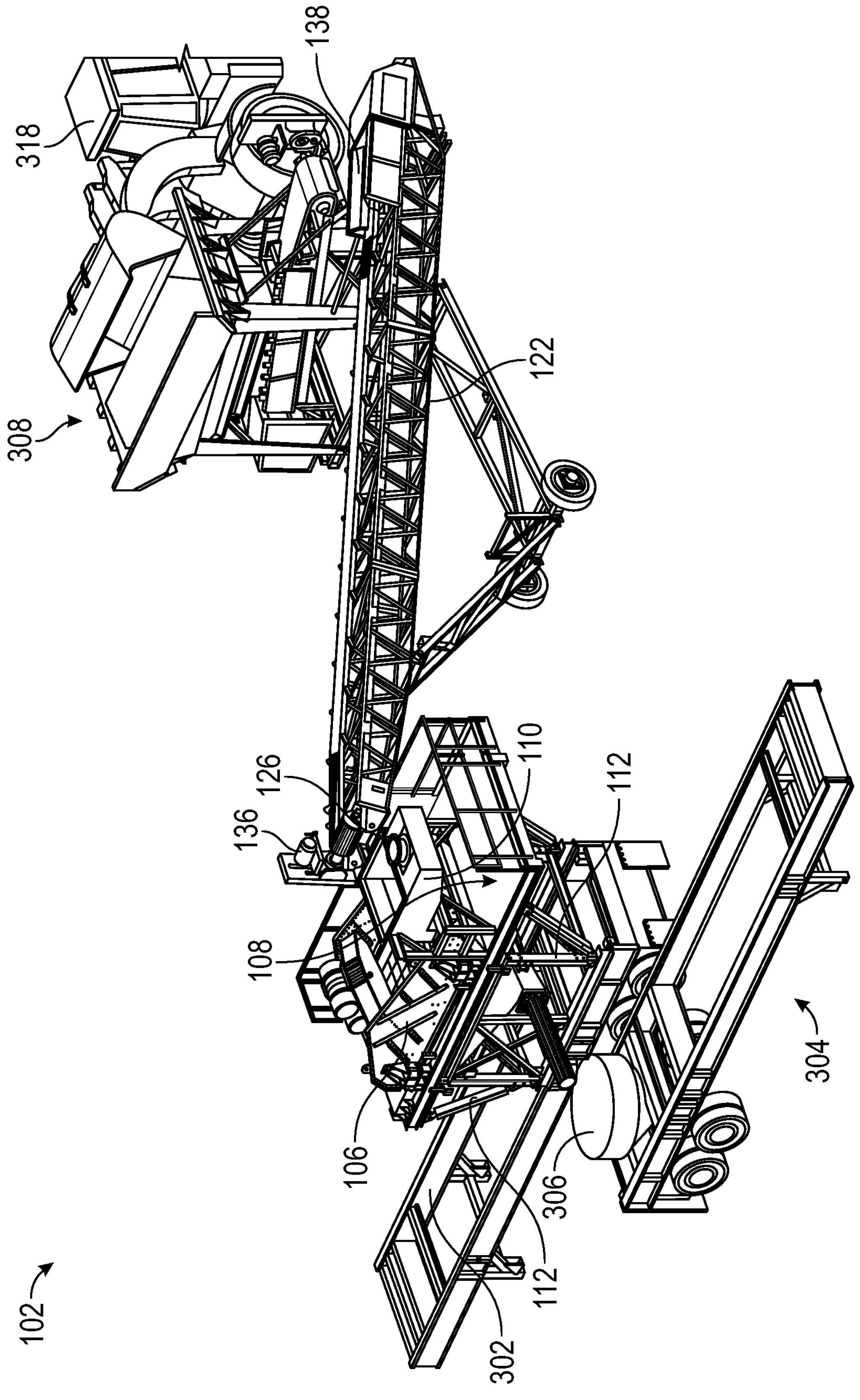
FIGS. 3A, 3B & 3C illustrate perspective views of another of the many possible embodiments of a wellsite wet screening system.
Figure 3B:
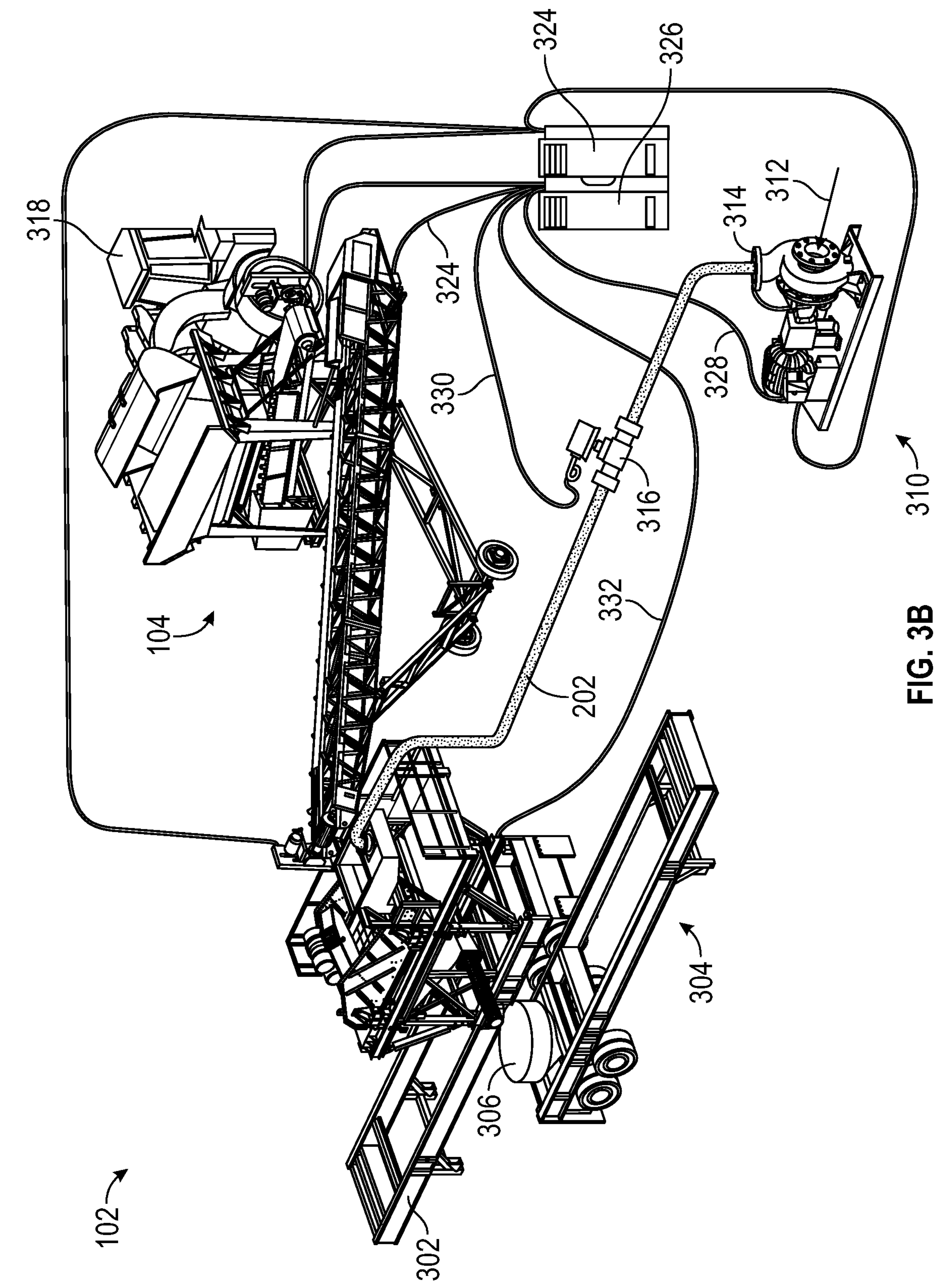

Referring to both FIGS. 3A and 3B, they provide an illustration of another embodiment of a wellsite wet screening system 300 according to our inventions. This embodiment utilizes the wet screening component 102 and the proppant supply component 104 previously described with certain modifications and additions. First, the wet screening component 102 is mounted on a tractor trailer or truck chassis 302 so that it is mobile and transportable to other wellsites as needed or desired. In this first alternate embodiment 300, the wet screening component 102 is rigidly mounted to the trailer/chassis 302 for transportation to the wellsite. Those of skill will understand that FIGS. 3A and 3B do not necessarily illustrate the preferred location on the trailer 302 for the rigidly mounted wet screening component 102. Once at the wellsite, the wet screening component may be unsecured from the trailer or chassis so that the wet screening component 102 may be leveled by extending leveling legs (preferably 4) to the ground and adjusting the height thereof. In this embodiment 300, it is preferred that all plumbing, power, and data connections to the wet screening component 102, the proppant supply component 104, and other equipment may be uncoupled at each of those components to aid mobility, make-up and tear-down.

For example, the support structure 112 may have rigid piping coupled thereto with flanges, such as quick connect flanges, at each end. The vibratory screening assembly 106 also may have rigid piping coupled thereto to feed one or more water spray systems 204, such as pipes, associated with the vibratory screen assembly 106 and/or associated with the inlet hopper 110. Once the wet screening system 102 is properly positioned at the wellsite, the rigid piping on the support structure 112 and the vibratory screen assembly 106 may be coupled with flexible conduit to prevent damage caused by vibrations of the system. The support structure 112 piping may be coupled to a water supply pump 310 with rigid, flexible, or a combination of rigid and flexible piping.

FIGS. 3A and 3B show a loading hopper system 308 that may be used to load proppant 200 onto the belt conveyor 122. The loading hopper system 308 may comprise an elevated hopper 318 into which a material handler, such as a front-end loader 320, or other such equipment, dumps proppant 200 from a pile or other source into the conveyor inlet 138. These figures illustrate that the load hopper 308 can discharge onto a small conveyor 322 that deposits the proppant onto the conveyor inlet 138. It is preferred that the secondary conveyor 322 is driven by an AC motor with speed control, such as a variable frequency drive. In this preferred embodiment, the primary conveyor 122 comprises a load transducer associated with the belt to determine, relatively or absolutely, the weight of proppant (including any moisture) transferred by the load hopper 318 and conveyor 322 to the primary conveyor 122. The speed of the of the secondary conveyor 322 can be adjusted to control the amount of proppant delivered to the inlet hopper 114. Alternately, the load hopper 318 may deposit proppant directly into the conveyor inlet 148 with need for an additional conveyor.

As shown in FIG. 3B, a fluid supply pump 310, may comprise a centrifugal pump, axial pump, positive displacement pump or other fluid moving device suitable to supply water to the wet screening component 102. The water pump 310 comprises an inlet 312 and an outlet 314. Preferably the water supply system comprises a fluid meter 316, such as flow rate meter (e.g., volumetric or mass). Although the fluid meter 316 is illustrated adjacent the pump 310, it may be located elsewhere in the fluid supply path, such as mounted to the platform support 112. Typically, the pump 310 will draw water from a tank or pond, or storage containers suitable for the fracing operations. As discussed above, it is preferred that the fluid supply 310 be configured to supply fluid for wet screening at flow rates of between about 1,000 gal/min to about 2,000 gal/min.

FIG. 3B also shows that the mobile wet screening system 300 (or any embodiment of our inventions) may comprise a centralized power system 324 for distributing power to the wet screening component 102, the proppant supply component 104. In addition to the power system 324, this embodiment preferably comprises a controller 326 arranged and structured to acquire data and generate control signals for various components. For example, the controller 326 may comprise input/output module(s), human interface device module(s), memory module(s) and processing module(s) arranged and connected so that the controller 326 can receive data from, for example, the flow meter 316, analyze, manipulate, or utilize that data, such as with one or more algorithms or software programs, to control or adjust the pump 310 to achieve a desired fluid flow rate. FIG. 3B illustrates control link 328 to the water pump, a control link 330 to the fluid meter 316, and a control link 332 to the wet screening component 102. This control link may provide data from individual components, meters, or transducers on the wet screening component 102. For example, and not limitation, the control link 332 may provide data concerning one or more of: the speed of the vibratory motor(s) 120, a liquid level in the collection bin 114, and/or a liquid level in the hopper 110. It is preferred that system 100 comprise a moisture sensor to determine the moisture content of the proppant for weight determination purposes. It is preferred that the load hopper 308 comprise a moisture sensor, such as near infra-red moisture sensor or radio frequency moisture sensor to aid the determination of the amount of proppant delivered to the inlet hopper 114. Also, in some embodiments, the bin discharge may comprise a density meter, such as a nuclear or non-nuclear density meters.

A control link 334 is illustrated between the controller 326 and the proppant supply component 104. This control link may provide data from individual components, meters, or transducers on the proppant supply component 104. For example, and not limitation, the control link 334 may provide data and/or control concerning one or more of: the speed of the belt conveyor 122, a weight of proppant on the belt conveyor 122, a moisture of the proppant, and/or a volume of proppant on the belt conveyor 122.

Although the power system 324 and controller 326 are shown separately from the other structures in FIG. 3, it will be understood that the power system 324 and the controller 324 can be associated with the wet screening component 102 or with the proppant supply component 104. Further, the power system 324 and controller 326 can be separate systems or can an integrated system, as illustrated. The controller 326 may comprise a suitably programmed laptop computer, tablet, or smart phone with a suitable control interface. And, while the control/data links 328, 330, 332, and 344 are illustrated as hard-wired communication links, it will be understood that all forms of wireless control/data link, including near field communication protocols, are contemplated for optional or potential use with all embodiments of our inventions.

As discussed above, the motors utilized in by the proppant supply component 104 and the water supply pump 310, if any, are preferably AC motors with variable frequency drives for precise control the speed of the motors. It is also preferred that the main feed box conveyor be instrumented so that a rate of proppant, e.g., weight or mass per unit time, delivered to the feed box can be determined and/or controlled.

The controller 326 may comprise a ruggedized computer system, logic controller, or other feedback control system. For all embodiments disclosed herein, the weight transducers, such as one on the proppant supply component 104, a flow meter 316 in the fluid supply system, and variable speed motors (e.g., conveyor motor 120, fluid pump motor 310) may be, but is not required to be, operatively connected, such as wired or wirelessly, to the controller so that a proppant feed rate and/or a fluid feed rate and/or a proppant slurry feed rate can be monitored, such as on a controller display or personal communication device (e.g., Smart Phone or tablet), controlled, such as by the controller sending control information (e.g., voltage or data) to a motor or valve or other controlled device, and/or adjusted, such as by an operator changing input data or control data used by the controller through a controller display or personal communication device (e.g., Smart Phone or tablet). For example, and not limitation, it is preferred that an operator may input a desired proppant slurry feed rate for the frac blender tub, or range of rates, into the controller via a controller display or wirelessly via a smart device. The controller, which is operatively connected to the appropriate control devices and data devices, can adjust the speed of the conveyor(s), the amount of fluid delivered, or other properties of the screening system to maintain the proppant slurry rate at the desired value, e.g., about 5 lbs/gal, a desired or range, e.g., about 3.0 to about 6 lbs/gal (as described above).

It will be appreciated that not all of the control links and meters, transducers, and controllable items discussed above need to be used, or may be desired, for a particular embodiment of our inventions. A fully "dumb" embodiment requiring only power to a fully "smart," instrumented and controlled/controllable embodiment and all permutations in between are within the scope of the inventions disclosed herein.

Also illustrated in FIGS. 3A and 3B is a frac fluid blending system 304, such as a fracing truck, which may comprise a blending tub 306. Note that the other equipment, such as pumps and valves, necessary for a conventional frac fluid blending truck 304 are not shown for purposes of clarity. It can be seen how in this embodiment the frac slurry discharge conduit 134 feeds the frac slurry into the frac blender tub 306. This illustrates that the height of the collection bin discharge 128 likely is an important design consideration for embodiment of the present invention. As discussed above, the platform support frame 112 can be height adjustable to account for the different fracing truck designs.

Figure 3C:
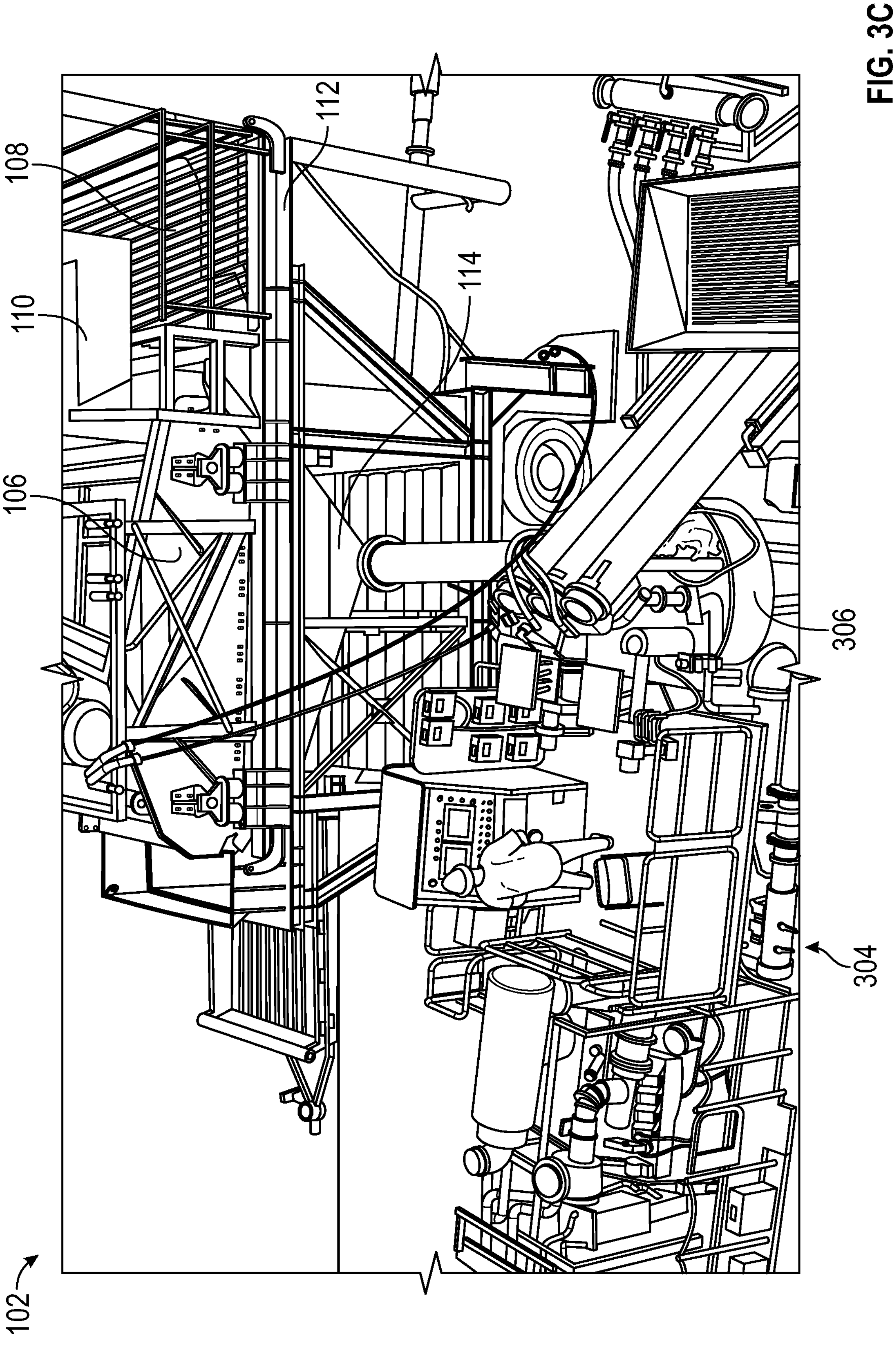

FIG. 3C illustrates the interface between the wet screening component 102 and a frac fluid blending system 304, such as a frac truck. As illustrated, the discharge conduit 134 can be seen passing frac slurry from the collection bin 114 to a blender tub 306 for further processing by the blending system 304. It will be appreciated from FIG. 3C, that the proppant processed by the wet screening component 102 is passed directly to the frac fluid blending system 304. It is preferred that the frac fluid blending system 304 is near the wet screening component 102, such as within 15 to 50 feet and that the collection bin discharge 132 is immediately adjacent the wellhead of the well to be frac'ed.

Figure 4A:
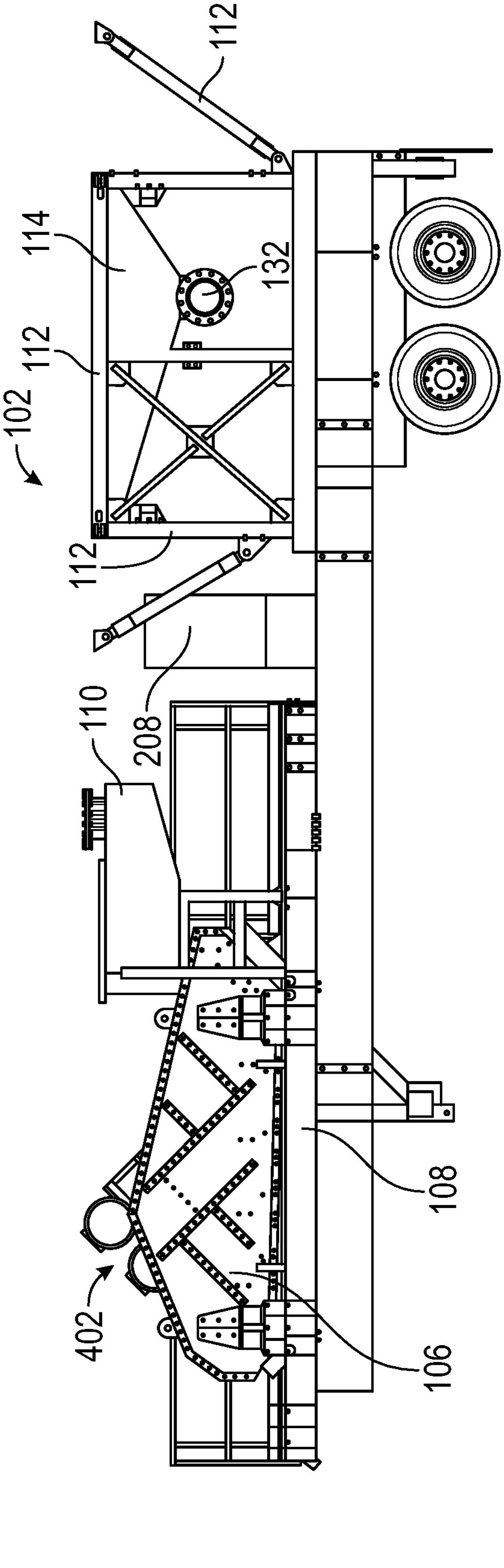
FIGS. 4A and 4B illustrate the wellsite wet screening system of FIGS. 3A & 3B mounted on a chassis or trailer for transportation to a wellsite.
Figure 4B:
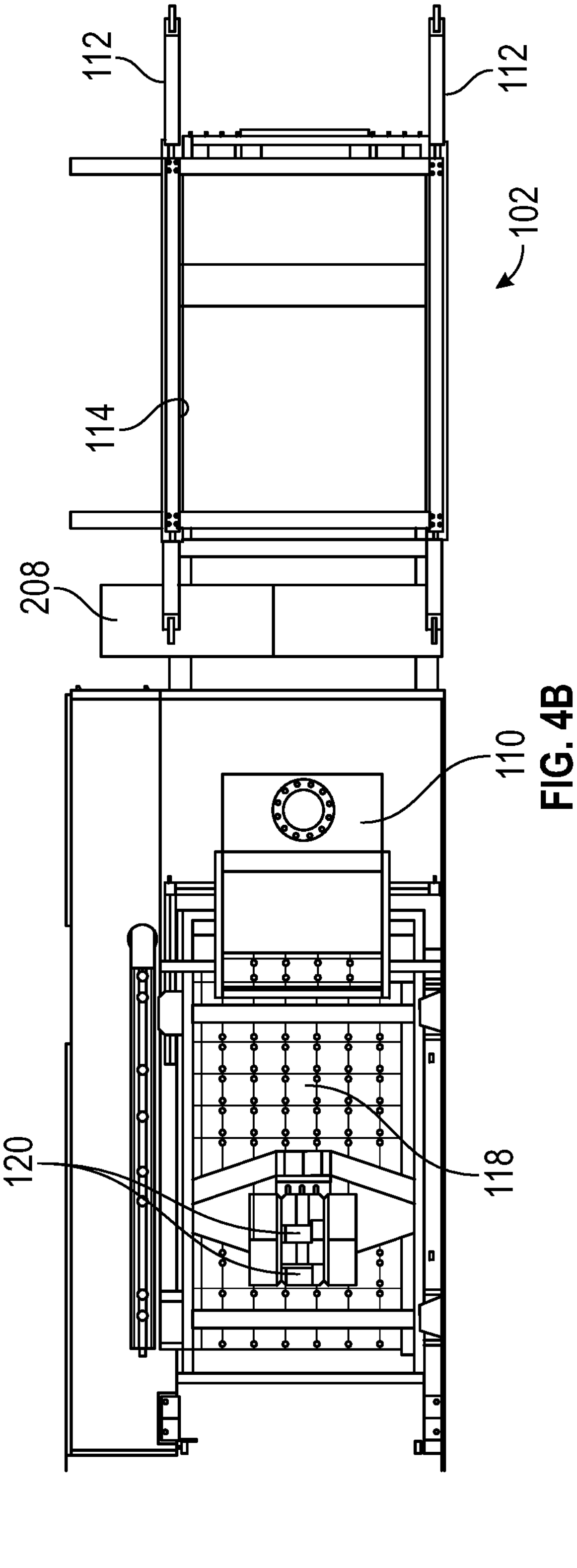

FIGS. 4A and 4B illustrate an alternate embodiment of the wet screening system of FIGS. 3A and 3B, in which the wet screening component 102 is not rigidly mounted to the truck chassis or trailer 302, but rather is deployable or moveable on the trailer 302 from a transporting position to an operating position. In this particular alternate embodiment, the deployable assembly 402 comprises the vibratory screening assembly 106, the inlet hopper 110 and hopper frame, and platform 210. The deployable assembly 402 in this embodiment does not include the support frame 112 and associated collection bin 114. The deployable assembly 402 is structure and configured to be secured in a first or transport location 404 on the chassis 302 when the wet screening component 102 is moved to different locations, especially along roadways or highways where load height restrictions are enforced.

Fixed in a second location 406 on the trailer 302 is platform support frame 112 comprising structural members, such as steel beams, arranged and configured to securely, but removably support the deployable assembly 402 during operation of the wet screening component 102. The support structure 112 also comprises the collection bin 114 below the vibratory screening assembly 106 so that the frac slurry is collected by the bin 114 and discharged through port 132 to a frac fluid blending system Once the wet screening component 102 is positioned at the well site, the deployable assembly 402 is unsecured from the transporting position and may be lifted into position on top of the support structure 112 and removably secured thereto for operation. For this embodiment, the deployable assembly 402 may be lifted into operational placement on the frame 112 with conventional equipment, such as a gin pole truck or crane. Similar to the embodiment illustrated in FIGS. 3A, 3B and 3C, the support structure 112, and therefore the deployable assembly 402, may be leveled so that the screen 118 is level during operation.

In a variation of this deployable embodiment, the support structure 112 may comprise hinged or rotation joints configured and arranged such that when the deployable assembly 402 is mounted on the support structure 112, the joints are locked or braced in position for operation of the wet screening component 102. When the wet screening component 102 needs to be moved to a different location over the roads, the joints can be unlocked or unbraced, and the support structure 112 rotated about the joints to lay or place the deployable assembly 402 on or in the transporting location 404 and secured to the chassis 302 for transport. One or more fluid rains (hydraulic or air) may be coupled to the support structure 112 and/or to the trailer 302 to control raising and lowering of the deployable assembly 402. Alternately, the deployable assembly 202 can be winched into place.

Regardless of how the deployable assembly 402 is moved into operational position 406, other equipment, such as the frac slurry conduit 134 (shown in FIG. 3), discharge chute 208, power cables 210, 212, control links 328, 330, and 332, and other equipment, are configured to securely, but removable, attach to or be stored on the trailer 302 during transport.

Figure 5A:
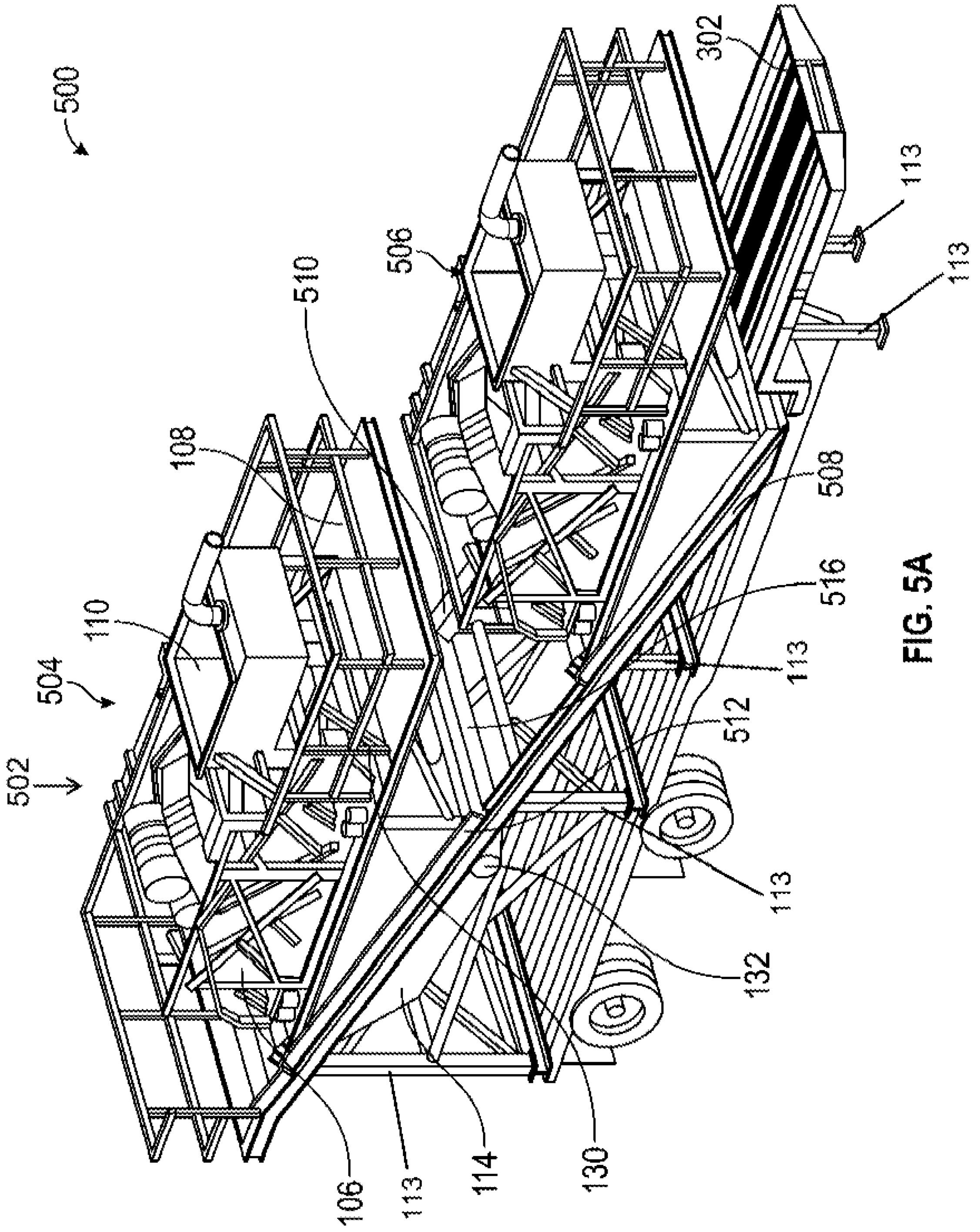
FIGS. 5A and 5B illustrate another embodiment of a mobile, wellsite wet screening system.
Figure 5B:
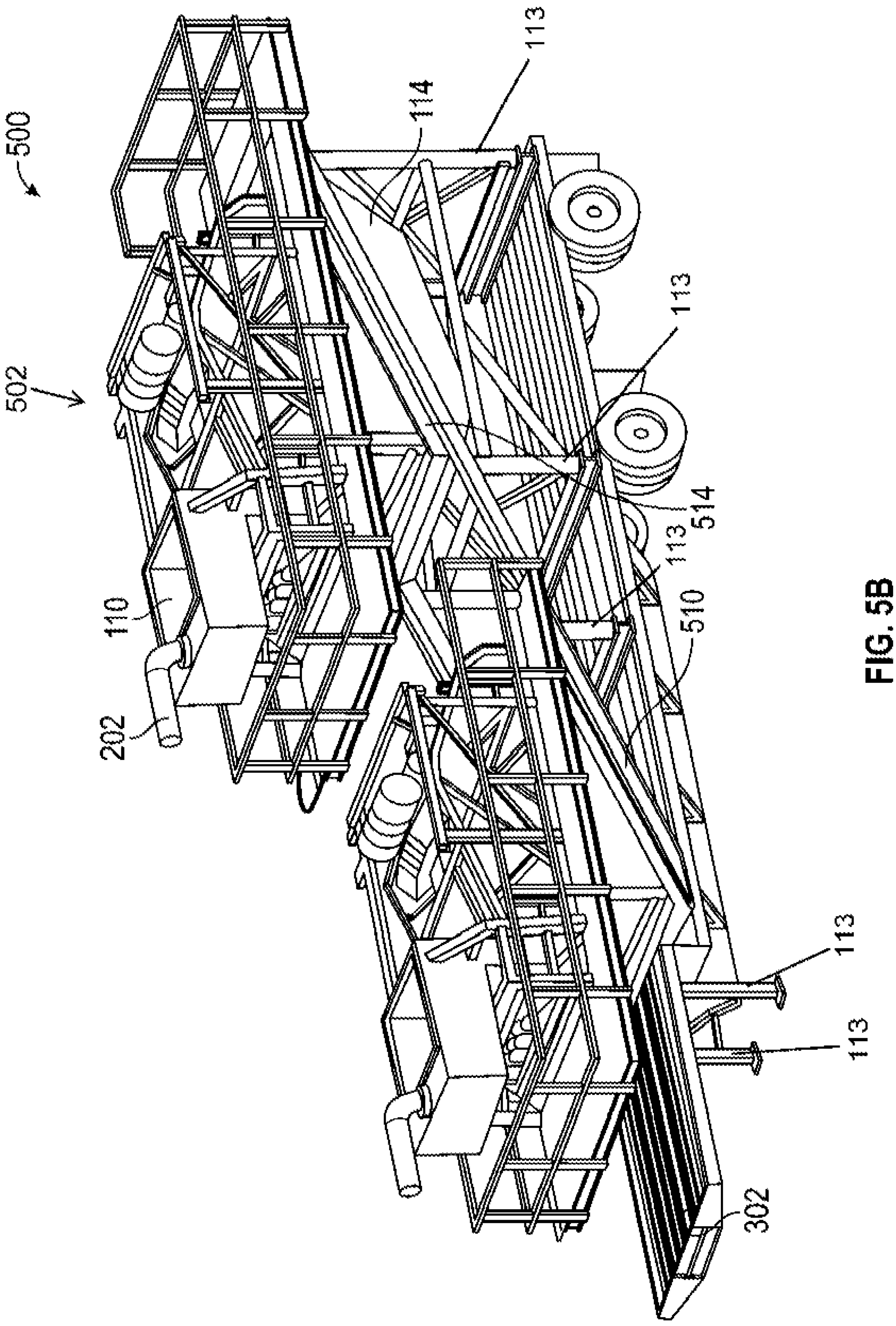

FIGS. 5A and 5B illustrate yet another embodiment of a mobile, wellsite wet screening component 500. This embodiment utilizes a deployable assembly 502 similarly to the embodiment illustrated and described in FIGS. 4A and 4B. For this embodiment, the deployable assembly 502 comprises the vibratory screening assembly 106, the platform 108, the inlet hopper 110 and hopper frame 130, and the collection bin 114. In contrast to the embodiment illustrated in FIGS. 4A and 4B in which the collection bin 114 is part of the support frame 112, in this embodiment the collection bin 114 is coupled to the deployable assembly 502, such as to the underside of platform 108.

Like the embodiment of FIGS. 4A and 4B, this embodiment comprises a operating position 504 and a transporting position 506 for the deployable assembly 502. This embodiment comprises slide rails 508 and 510 that are angled from a low point at one end of the trailer or chassis 302, such as the front end, to a high point at the other end of the trailer/chassis 302. The deployable assembly 502 comprises correspondingly angled slide rails 512, 514 that are structurally configured to slidingly engage with slide rails 508 and 510. The deployable assembly 502 also may comprise one or more transverse beams 516 extending between the inside surfaces of slide rails 512, 514 and below the sliding surface of slide rails 508, 510. These one or more transverse beams 516 may be structurally configured to function to prevent the deployable assembly 502 from cocking or canting while traversing the slide rails from the transporting condition 506 to the operating condition 504 and vice versa.

When the deployable assembly 502 is in the transporting condition or position, the assembly 502 may be locked or secured in place such as through ratchet tiedowns, rail locks, and similar devices. When the deployable assembly 502 is in the operating position or condition 504, the assembly 502 may be locked or secured in place as described for the transporting position 506. Preferably, however, the deployable assembly 502 is secured in place by physically securing the assembly 502 to the slide rails 508 and 510, such as by threaded fasteners or removable pins. Whatever securing means is used, is must be structurally sufficient to withstand the forces generated by operation of the vibratory screening assembly 106.

The motive force to slide the deployable assembly 502 from the transporting position 506 to the operating position 504 can be supplied by external sources such as a winch truck, or by a winch system integral with the trailer/chassis 302. Alternately long stroke rains or cylinder can be deployed between the slide rails 508, 510 and the deployable assembly 502. Still further, each of the rails 508, 510 may comprise a rack gear and the deployable assembly may comprise corresponding powered pinion gears to move the assembly 502 between positions. Other means for translating the deployable assembly 502 are also contemplated by our inventions. While this particular embodiment relies on basic sliding contact between the rails, other friction reduction systems, such as rollers, wheels, cogs, and the like may be used as well.

Those of skill having the benefit of this disclosure will appreciate that modifications of this embodiment are readily apparent. For example, and not limitation, one alternate embodiment comprises the collection bin 114 being a two-piece component with a first portion coupled to the platform 108 and the other portion coupled to the support structure 112. When the deployable assembly 502 is moved to the operating position, the collection bin 114 is completed. It is preferred that a replaceable gasket seals the two portions of the bin. Still further, it is contemplated that the collection bin may be part of support structure 518, and not a part of the deployable assembly 502. While it is not necessary to seal the collection bin 114 to the underside of the platform 108 when the deployable assembly 502 is in the operating position 506, sealing is contemplated for certain embodiments and preferred.

Figure 6:
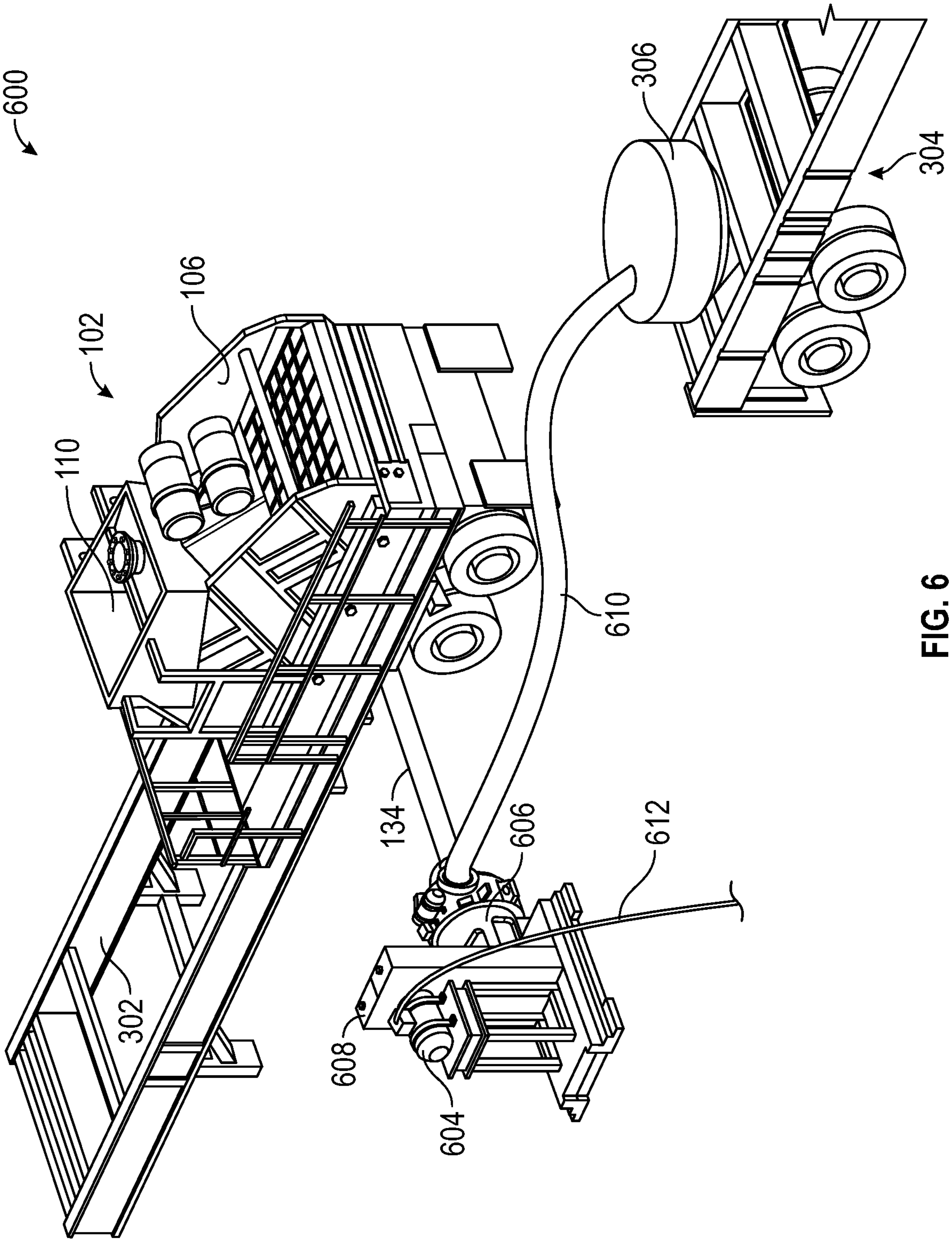
FIG. 6 illustrates another yet another embodiment of a mobile, wellsite wet screening system.

FIG. 6 illustrates yet another of the many possible embodiments of a mobile, wellsite wet screening system 600. In this embodiment, the wellsite wet screening component 102 is coupled directly to a truck chassis or tractor trailer 302, with the collection bin 114 at least partially within the trailer frame. It will be appreciated that with this embodiment the bin outlet 132 may be relatively close to the ground, such as within 1 to 2 feet, in comparison the outlet locations of the embodiments illustrated in FIGS. 1, 3A and 5A. As persons of skill will appreciate, this embodiment also benefits from leveling structures 113. Because of this position of the outlet 132, this embodiment benefits from an optional frac slurry pump system 600.

The frac slurry pump system 600 comprises a motor 602, preferably an AC motor with a variable frequency drive, and a fluid pump 604, such as a centrifugal pump. The frac slurry pump system 600 may be a direct drive system where the motor shaft is directly coupled to the pump shaft, or the system 600 may have a transmission 606 as illustrated in FIG. 6 comprising, for example, a belt drive assembly with speed reduction.

In operation, the pump system 602 draws the frac slurry from the collection bin 114 and lifts or pumps the frac slurry to the frac fluid blending system 304 for final processing before injection of the frac fluid into the well. As described above with respect to the other disclosed embodiments, the pump system 602, including blending system conduit 610 may be stored on trailer 302 during transportation of the wet screening component 102.

Figure 7A:
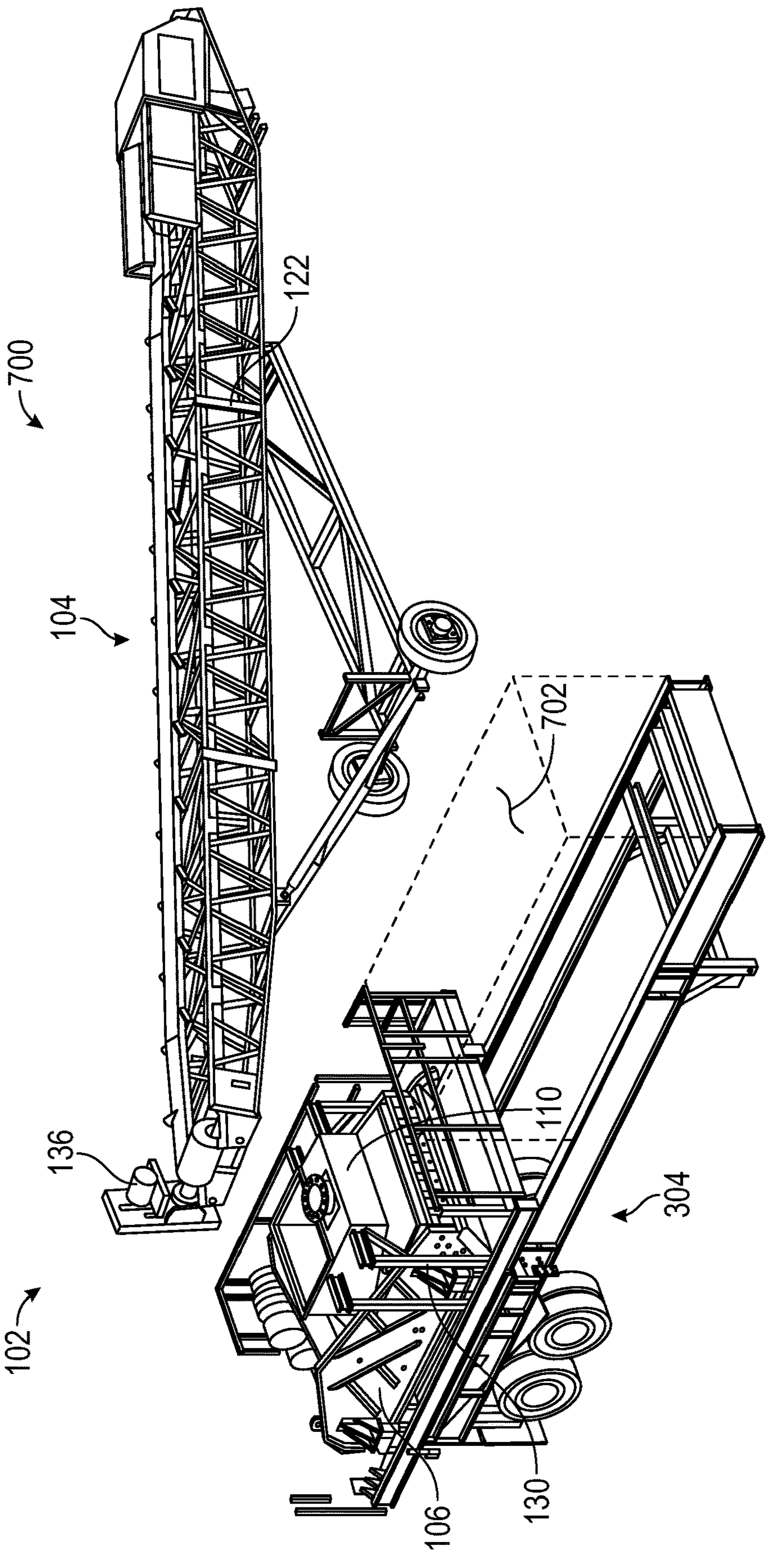
FIGS. 7A & 7B illustrate a mobile, wellsite wet screening system integrated with a frac fluid blending system.
Figure 7B:
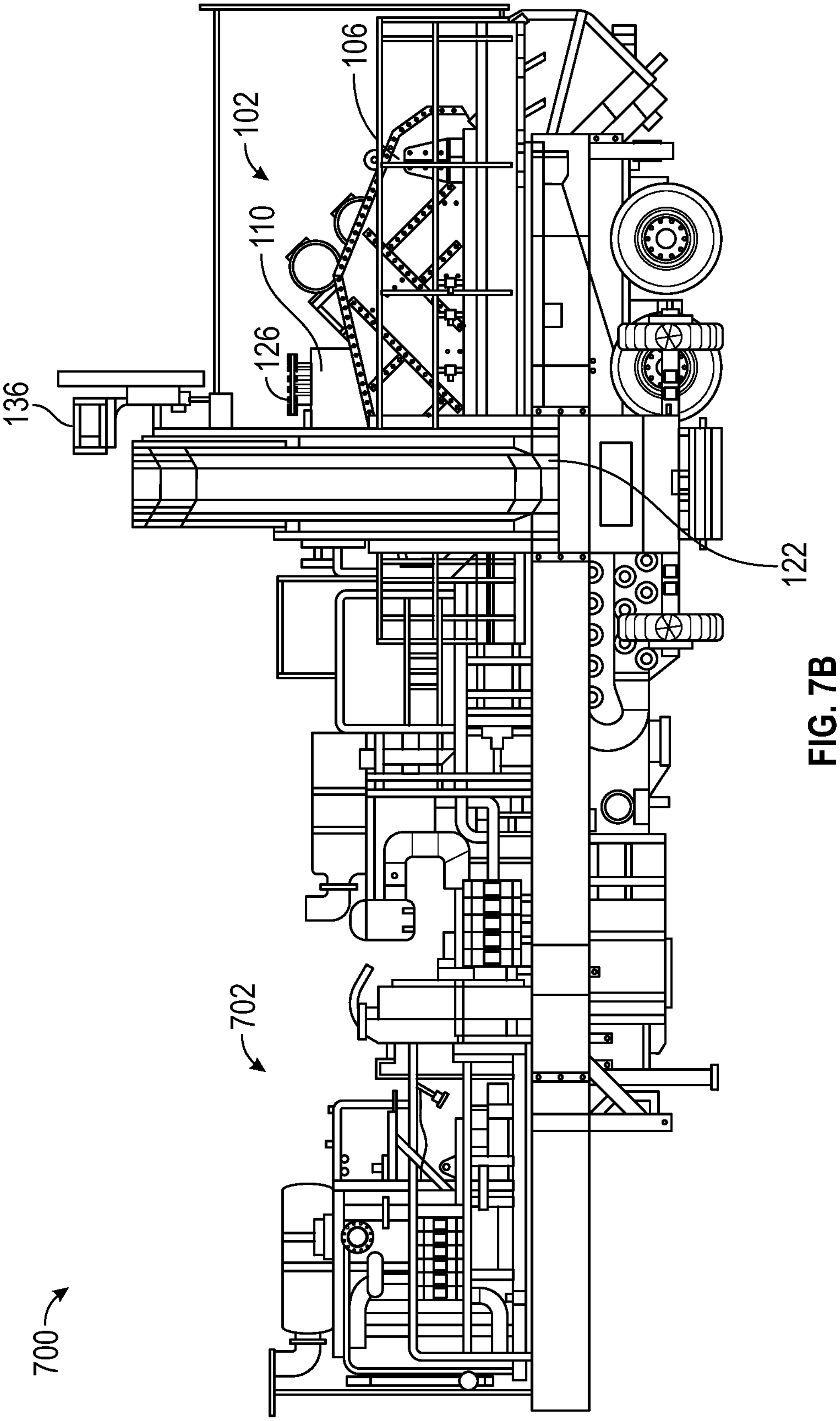

FIGS. 7A and 7B illustrate another of the many possible embodiments of a mobile, wellsite wet screening system 700. In this embodiment, a wet screening assembly comprising a vibratory screening assembly 106, an inlet hopper 110 and hopper frame 130 are incorporated into a frac fluid blending system 304, such as a frac truck.

Persons of skill in the art will appreciate that the equipment, pumps, valves, and controls that are part of a conventional frac fluid blending system 304 are not specifically called out in FIGS. 7A and 7B for purposes of clarity. It is contemplated that conventional frac fluid blending systems 304 can be retrofitted with this embodiment of the wet screening system 102, and that new frac fluid blending systems can be developed with these inventions.

In embodiments of this type, it will be appreciated that power and control for the wet screening system may be supplied by the components of the frac blender truck 304. Modification to include the water spray system for wet screening along with water flow metering and control may be required. It is contemplated that data from the conveyor weight scales and/or from the flow meter and/or form the moisture sensor will be communicated to the frac blender truck controller. As in the previous embodiments discussed, it is preferred that the oversize particle outlet of the vibratory screener be located at the rear of the trailer or truck so that oversize particles and/or contaminants may be collected and removed. It will be appreciated that this embodiment reduces the number of individual components or trailers that are necessary for mobile, wellsite wet screening of proppants.

Our inventions also contemplate that an embodiment of a mobile, wellsite wet screening system utilizing one or more aspects of the disclosed inventions may require a mobile power source, such as an electrical genset. For example, an internal combustion engine generator set maybe configured to supply single and/or three-phase electrical power to the conveyor motors 136 vibratory shaker motors 120, lights, instrumentation, controller 326, and other components. It is contemplated that the internal combustion generator set may be piston or turbine based and may be fueled with diesel, gasoline, distillate, natural gas, or flare gas, as available. In those fields that have an electrical grid supply, the electrical generator may not be necessary. Those of skill in the art will understand that the electrical power generator should be sized to provide power sufficient for the pumps, lights, controller, and other electrical equipment, and usually will range between about 7 kW and about 20 kW. It is contemplated a that an additional trailer or skid may comprise an electrical genset, the fluid supply pump 310, controller 326, power distribution module, and storage for tools, equipment, supplies and cabling.

Now that the particular embodiments illustrated in FIGS. 1 through 7A have been described and enabled, it will be appreciated by those of skill in the art that features, and functions disclosed for with respect to one embodiment may be incorporated into any of the other disclosed and enabled embodiments or any of the many other possible embodiments. For example, and not for limitation, any embodiment may comprise spray bars or spray heads 204. Any embodiment may utilize, but are not required to utilize a controller 326, and one or more of the various control/data links, and the various meters, transducers and controllable items disclosed with respect to FIG. 3B for operating and controlling a wellsite set screening system. For avoidance of doubt, we contemplate that each of the embodiments disclosed herein, and those embodiments yet to be designed, may utilize some or all of the control aspects disclosed concerning the embodiment of FIG. 3B.

While embodiments have been disclosed with a proppant supply component 104 comprising a belt conveyor 122, it is contemplated that a conventional proppant box may be suspended or support above the inlet hopper 110 to feed proppant directly, and controllably, into the wet screening component 102.

Now that we have disclosed and enabled several possible embodiments of our inventions, we now disclose the results of an actual wellsite wet screening operation performed with a prototype system resembling the embodiment illustrated in FIG. 2. The prototype system had a 7' by 14' vibratory screen with 3-millimeter square openings therein. The minimum water input was 50 bbl/min, and the system was operated with about 53 bbl/min of water. The total water consumed by the prototype system and frac fluid blending system was about 70 bbl/min total, meaning that the blending system added about 17 bbl/min of water. The loading hopper conveyor utilized a variable frequency drive AC motor, and the speed was adjusted/controlled to deliver the correct amount of proppant (up to about 1,000 tons per hour) to the main belt conveyor based on the pump schedule. The main belt conveyor delivered the proppant to the inlet hopper or feedbox of the wet screening component. The proppant was mixed with water and discharged to the screen. Spray bars added water to help move the proppant through the screen into the collection bin. Oversized debris, including oversized proppant was discharged from the screen and collected. The prototype was configured such that gravity would feed the frac slurry from the bin to the frac fluid blending system at a feed rate of about 5+ lbs of proppant per gallon of water.

The start up of this prototype system comprised starting water flow to the system by energizing the fluid supply system and setting the flow rate to about 53 bbl/min. The system passed this water to the frac fluid blending system for use in pressure fracing the well, although no well was frac'ed during this prototype run. Once the system was operating in a steady state with no proppant, the load hopper began to discharge proppant to the secondary conveyor for delivery to the primary conveyor. The weight sensor in the primary conveyor was used to adjust the proppant delivery to the primary conveyor so that the appropriate amount of proppant was delivered to the inlet hopper. The prototype was operated in this manner and the frac slurry captured by the collection bin was fed directly to the frac fluid blending system.

For those embodiments that use a controller, one of many possible algorithms comprises 1) dynamically controlling an amount of water supplied to the system; 2) determining a moisture content of proppant that will be supplied to the system; 3) determining a normalized weight of proppant, based on the determined moisture content, delivered to the inlet hopper; 4) adjusting the amount of proppant delivered to the inlet hopper to a predetermined amount or range of amounts; and, optionally, 5) determining a density of the frac slurry exiting the collection bin.

An example job based on the performance of the prototype discussed above is presented below. This example assumes a 2 well pad requiring 30,000 tons total of dry sand, with 1,000 tons of pumped per day.

| Item | Utilizing Embodiment According to the disclosed Inventions | Utilizing Embodiment According to the disclosed Inventions | Utilizing Conventional Equipment and Processes |
|---|---|---|---|
| Proppant Cost, dry ($/ton) | n/a | $30 | $30 |
| Proppant Cost, wet ($/ton) | ~$15 | n/a | n/a |
| TransportCost ($/ton) | $9 | $9 | $30 |
| Wellsite Service ($/ton) | $15 | $15 | Included in Transport Cost |
| Total per ton ($) | $39 | $54 | $60 |
| Total Proppant Cost ($) | $1,170,000 | $1,620,000 | $1,800,000 |

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed is:

1. A system for creating a slurry, comprising:

a wet screening assembly comprising a screen with a plurality of openings through which material may pass, and a material hopper with an outlet disposed above at least a portion of the screen;

a material supply assembly comprising a variable speed motor and a material weight sensor, and wherein the material supply assembly is arranged to supply material to the material hopper at a controlled rate;

a fluid supply assembly comprising a fluid pump, and wherein the fluid supply assembly is arranged to supply fluid to the wet screening assembly;

a bin located below the wet screening assembly such that material and fluid that pass through the screen are collected in the bin as the slurry;

wherein a concentration of material in the slurry is determined by a rate or rates at which the material supply assembly supplies material to the material hopper and/or by a rate or rates at which fluid is supplied to the wet screening assembly; and a conduit coupled to the bin for passing the slurry from the bin without removing the material from the fluid.

2. The system of claim 1, wherein the wet screening assembly is coupled to a trailer or to a vehicle chassis, and further comprising a first configuration on the trailer or the vehicle chassis for transporting the wet screening assembly on roadways, and a second configuration on the trailer or the vehicle chassis for the wet screening assembly when wet screening material.

3. The system of claim 2, further comprising a support structure coupled to the trailer or the vehicle chassis to support the wet screening assembly.

4. The system of claim 3, wherein the wet screening assembly is lifted from the first configuration to the second configuration.

5. The system of claim 3, further comprising a plurality of force-producing rams coupled to the wet screening assembly and arranged to move the wet screening assembly from the first configuration to the second configuration.

6. The system of claim 2, further comprising an adjustment component having a plurality of adjustable legs and a length of at least one of which is adjusted to level the screen.

7. The system of claim 6, wherein the plurality of adjustable legs are extended to ground.

8. The system of claim 6, wherein the adjustment component comprises a plurality of force-producing rams.

9. The system of claim 2, wherein the fluid supply assembly delivers fluid at a rate or rates between 12 bbl/min and 119 bbl/min.

10. The system of claim 2, wherein the fluid supply assembly supplies fluid at a rate or rates greater than 50 bbl/min.

11. The system of claim 1, further comprising an adjustment component operatively coupled to the wet screening assembly allowing adjustment of a levelness of the screen.

12. The system of claim 1, further comprising a slurry pump for transferring the slurry from the collection bin.

13. The system of claim 1, wherein the fluid supply assembly delivers fluid at a rate or rates between 12 bbl/min and 119 bbl/min.

14. The system of claim 1, wherein the fluid supply assembly delivers fluid at a rate or rates greater than 50 bbl/min.

15. The system of claim 1, wherein the slurry collected in the bin has a material component of between 0.3 lbs/gallon and 12 lbs/gallon.

16. The system of claim 15, wherein the slurry in the collection bin has a material component of between 3 lbs/gallon and 6 lbs/gallon.

17. The system of claim 1, wherein the one or more rates of material supplied by the material supply assembly to the material hopper varies over time.

18. The system of claim 1, wherein the wet screening assembly is coupled to a trailer or a vehicle chassis for transporting the wet screening assembly to a wellsite, and wherein the wet screening assembly is uncoupled from the trailer or the vehicle chassis at the wellsite.

19. A system for creating a proppant slurry for use in hydraulic fracturing operations, the system comprising:

a wet screening assembly comprising a screen with a plurality of openings through which proppant and fluid may pass, and a hopper with an outlet disposed above at least a portion of the screen;

a proppant supply assembly comprising a variable speed motor, and wherein the proppant supply assembly is arranged to supply material comprising proppant to the hopper;

a fluid supply assembly comprising a pump and a fluid meter, and wherein the fluid supply assembly is arranged to supply fluid comprising water to the wet screening assembly;

a bin located below the wet screening assembly such that proppant and fluid that pass through the screen are collected in the bin as the proppant slurry;

an outlet in the bin for passing the proppant slurry from the bin;

wherein a concentration of proppant in the slurry is determined by a rate or rates at which the proppant supply assembly supplies proppant to the hopper and/or by a rate or rates at which fluid is supplied to the wet screening assembly; and a conduit coupled to the bin for passing the proppant slurry from the bin without separating the proppant from the fluid.

20. The system of claim 19, wherein fluid is supplied at a rate or rates greater than 50 bbl/min.

21. The system of claim 20, wherein the fluid comprises water, and the water in the proppant slurry is up to about 75% of the water by volume used to fracture a subterranean formation.

22. The system of claim 19, wherein the proppant slurry collected by the collection bin has a proppant component of between 3 lbs/gallon and 6 lbs/gallon.

23. The system of claim 19, wherein the frac slurry in the collection bin has a proppant component of 5 lbs/gallon or greater.

24. The system of claim 19, wherein the material supply rate to the hopper is at least 1,000 tons/hr.

25. The system of claim 19, wherein the variable speed motor comprises a variable frequency drive and the delivery rate of material supplied to the hopper varies over time.

26. A system for creating a sand and water slurry for use with a subterranean formation, the system comprising:

a wet screening assembly comprising a screen with a plurality of openings through which sand and water may pass, a hopper with a sand inlet, a water inlet, and an outlet, the outlet having an area less than a sand inlet area, and the outlet disposed above at least a portion of the screen;

a sand supply assembly comprising a motor, a variable speed motor drive and a weight sensor, and wherein the sand supply assembly is arranged to supply sand to the hopper;

a screen leveling assembly wherein the screen can be leveled before or during wet screening of sand;

a water supply assembly comprising a pump and a flow meter, and wherein the water supply assembly is arranged to supply water to the wet screening assembly;

a bin located below the wet screening assembly such that sand and water that pass through the screen are collected in the bin as the sand slurry;

wherein a concentration of sand in the slurry is determined by a rate or rates at which the sand supply assembly supplies sand to the hopper and/or by a rate or rates at which water is supplied to the wet screening assembly; and a conduit coupled to the outlet for passing the sand slurry from the bin without separating the sand from the water.

27. The system of claim 26, wherein the water supply assembly supplies between 12 bbl/min and 119 bbl/min of water to the wet screening assembly, and wherein a sand concentration of the sand slurry is between 0.3 lbs sand/gallon of water and 12 lbs/gallon of water.

28. The system of claim 26, wherein the water supply assembly further comprises a water spray component supplying fluid to at least a portion of the screen.

29. The system of claim 26, wherein the rate of sand supplied to the hopper varies over time.

30. The system of claim 26, further comprising a predetermined sand concentration value and wherein a speed of the motor and a flow rate of the pump are controlled to achieve the predetermined sand concentration value of the sand slurry.

31. The system of claim 26, wherein the water in the sand slurry is up to about 75% of the water by volume needed to fracture a subterranean formation.

* * * * *